(12) United States Patent
Nierhoff et al.

(10) Patent No.: US 11,024,918 B2
(45) Date of Patent: Jun. 1, 2021

(54) BATTERY HOUSING

(71) Applicants: ThyssenKrupp Steel Europe AG, Duisburg (DE); thyssenkrupp AG, Essen (DE)

(72) Inventors: Daniel Nierhoff, Mulheim (DE); Joachim Quandt, Dusseldorf (DE); Clemens Latuske, Dusseldorf (DE); Erik Hilfrich, Dusseldorf (DE)

(73) Assignees: THYSSENKRUPP STEEL EUROPE AG, Duisburg (DE); THYSSENKRUPP AG, Essen (DE)

( * ) Notice: Subject to any disclaimer, the term of this patent is extended or adjusted under 35 U.S.C. 154(b) by 293 days.

(21) Appl. No.: 16/324,272

(22) PCT Filed: Aug. 8, 2017

(86) PCT No.: PCT/EP2017/070008
§ 371 (c)(1),
(2) Date: Feb. 8, 2019

(87) PCT Pub. No.: WO2018/029167
PCT Pub. Date: Feb. 15, 2018

(65) Prior Publication Data
US 2019/0221797 A1    Jul. 18, 2019

(30) Foreign Application Priority Data
Aug. 11, 2016    (DE) .................... 10 2016 214 974.1

(51) Int. Cl.
*H01M 50/20*    (2021.01)

(52) U.S. Cl.
CPC ........ *H01M 50/20* (2021.01); *H01M 2220/20* (2013.01)

(58) Field of Classification Search
CPC ..................... H01M 2220/20; H01M 2/1077
See application file for complete search history.

(56) References Cited

U.S. PATENT DOCUMENTS

| 2009/0236162 A1 | 9/2009 | Takasaki et al. | |
|---|---|---|---|
| 2012/0021301 A1 | 1/2012 | Ohashi | |
| 2012/0301765 A1* | 11/2012 | Loo | H01M 2/1083 429/100 |
| 2012/0312614 A1* | 12/2012 | Fujiwara | H01M 2/1077 180/68.5 |
| 2012/0321927 A1* | 12/2012 | Loo | H01M 2/1083 429/100 |
| 2013/0192914 A1 | 8/2013 | Nakamori | |
| 2013/0229030 A1 | 9/2013 | Yamaguchi et al. | |

(Continued)

FOREIGN PATENT DOCUMENTS

| CN | 101548412 A | 9/2009 |
|---|---|---|
| CN | 103730616 A | 4/2014 |

(Continued)

*Primary Examiner* — Carlos Barcena
(74) *Attorney, Agent, or Firm* — The Webb Law Firm

(57) ABSTRACT

A battery housing for receiving battery elements, in particular for a vehicle, includes a case formed by a frame including one or more profiles and at least one first floor. The case provides an interior region for the battery elements. A second floor is positioned at a distance below the first floor and defines a space with the first floor. A cover covers the case.

18 Claims, 6 Drawing Sheets

(56) References Cited

U.S. PATENT DOCUMENTS

| | | |
|---|---|---|
| 2013/0249247 A1 | 9/2013 | Baum |
| 2014/0017538 A1 | 1/2014 | Nakamori et al. |
| 2015/0249240 A1* | 9/2015 | Hihara .................... H01M 2/10 180/68.5 |
| 2016/0118635 A1 | 4/2016 | Keller et al. |
| 2016/0288737 A1* | 10/2016 | Kamimura .......... B60R 13/0869 |

FOREIGN PATENT DOCUMENTS

| | | |
|---|---|---|
| DE | 102009037138 A1 | 2/2011 |
| DE | 102009058808 A1 | 6/2011 |
| DE | 102012102437 A1 | 9/2013 |
| DE | 102014203505 A1 | 9/2014 |
| DE | 102014115561 A1 | 4/2016 |
| DE | 112009004806 B4 | 3/2018 |
| JP | H9104240 A | 4/1997 |
| JP | 2012111465 A | 6/2012 |
| JP | 5528988 B2 | 4/2014 |

* cited by examiner

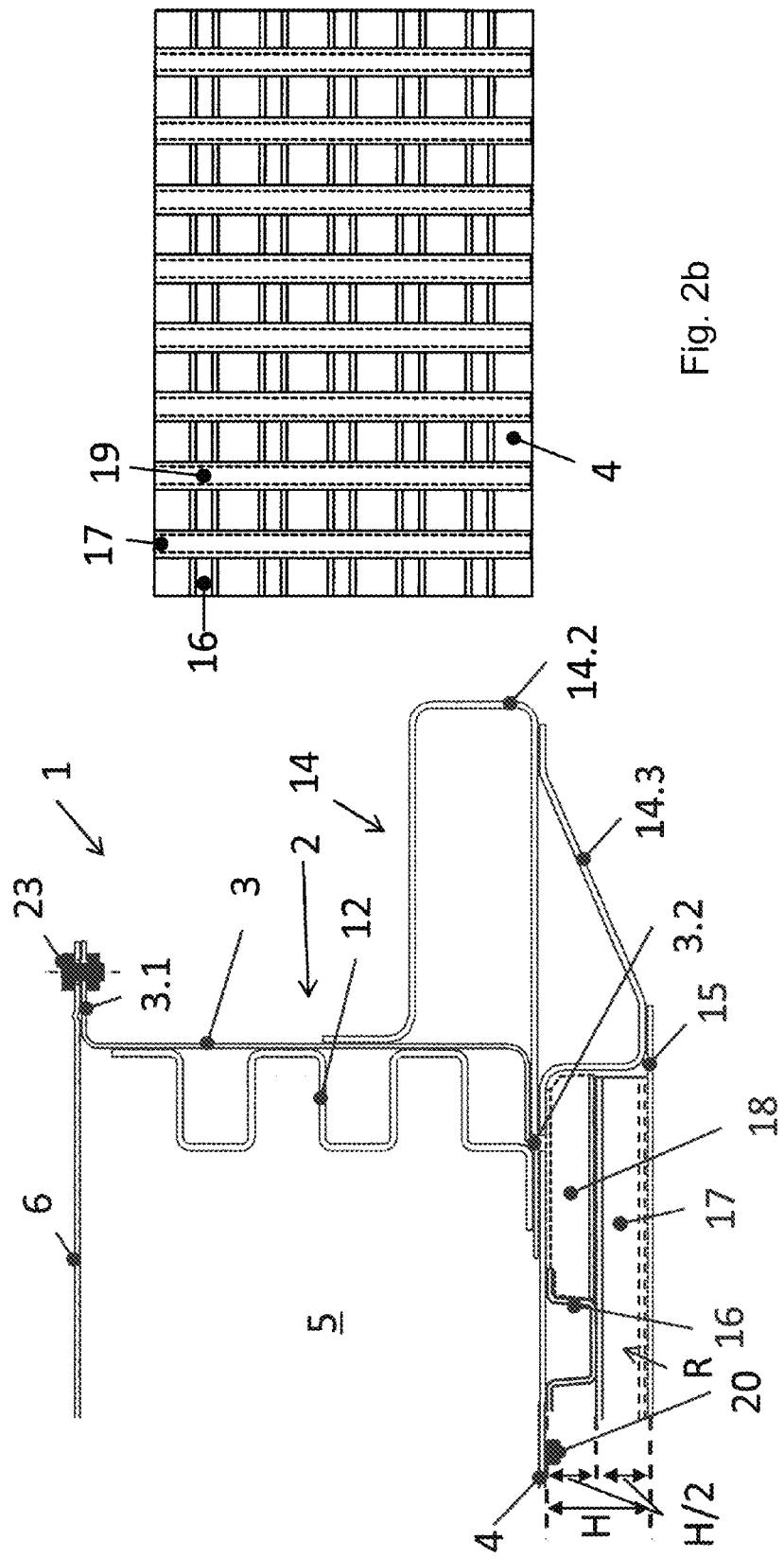

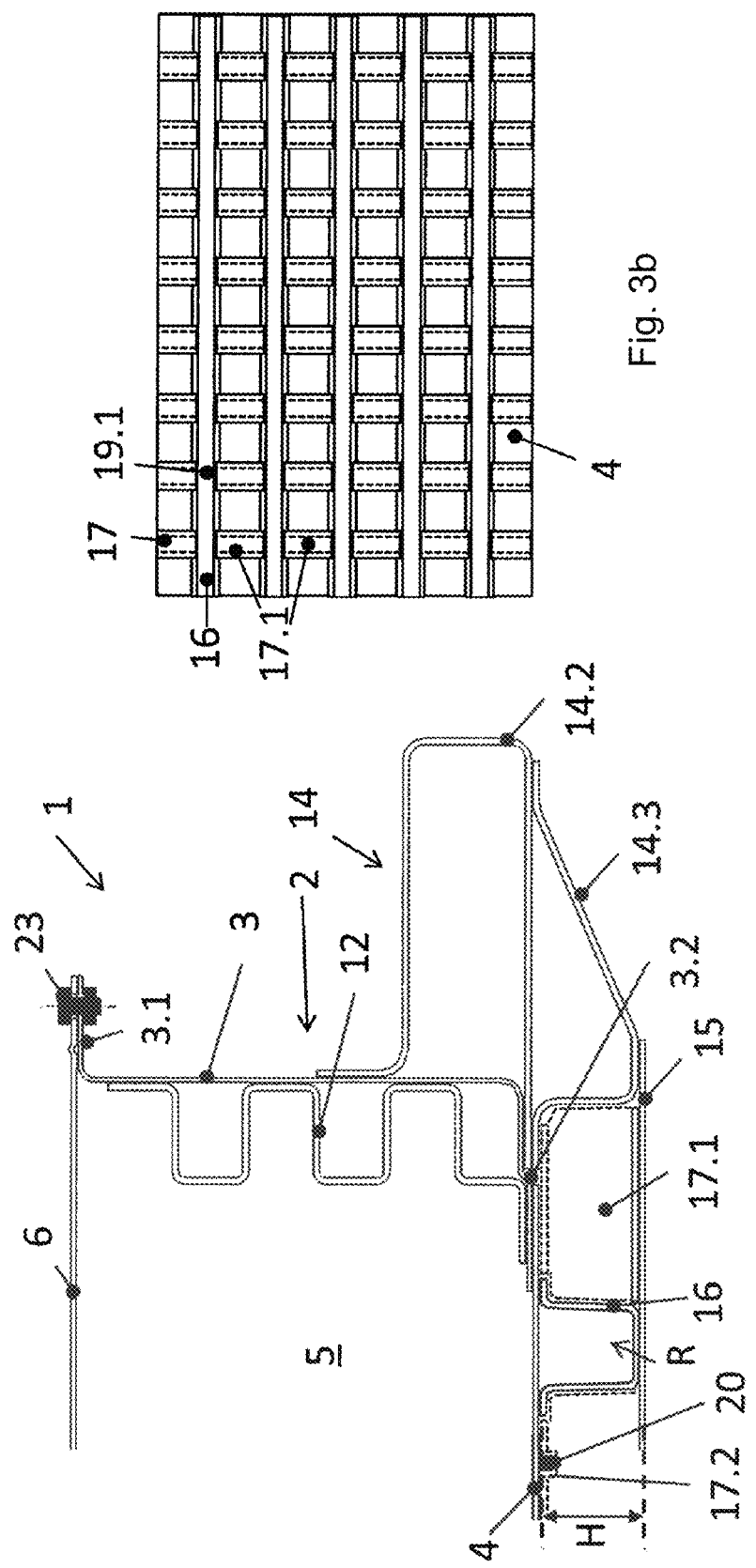

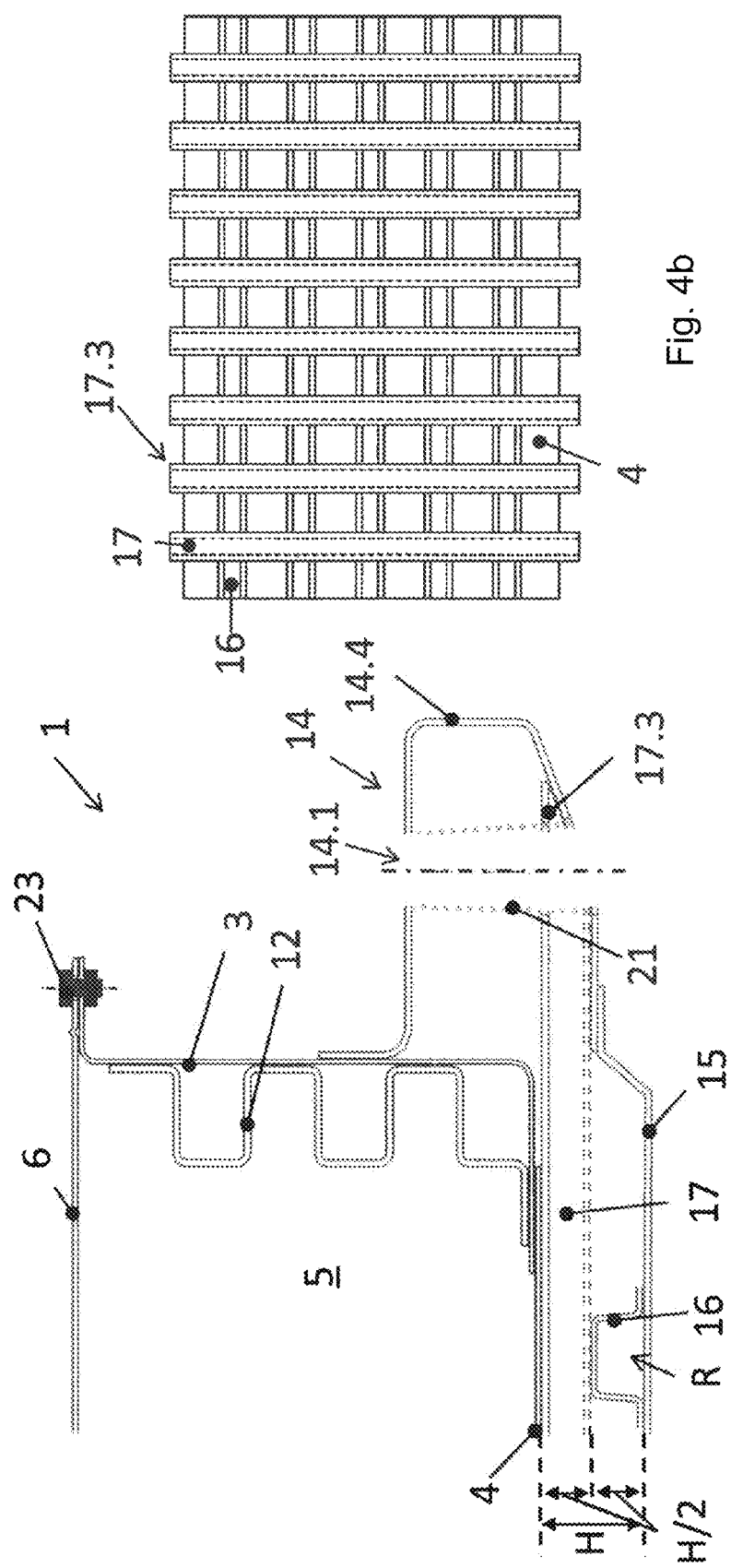

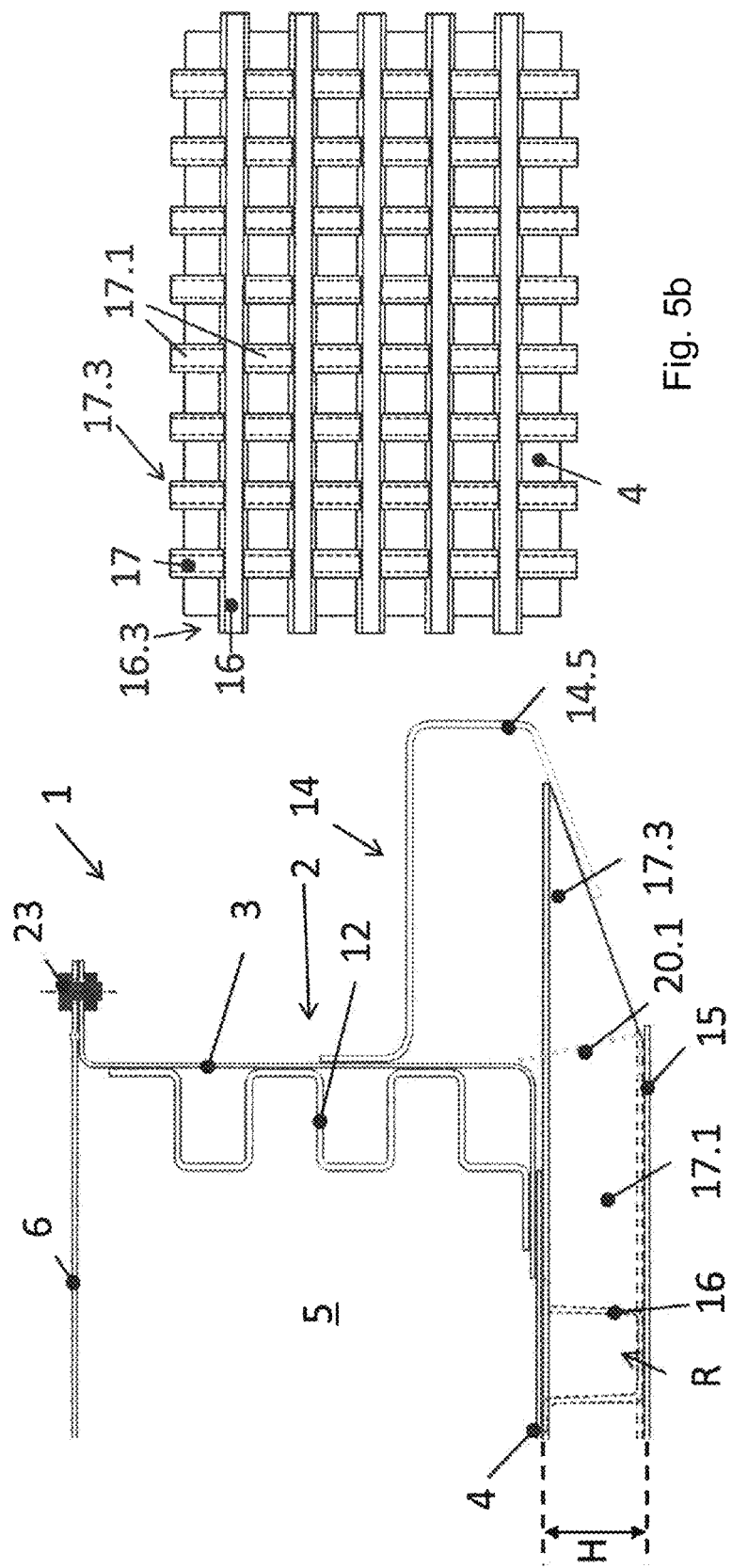

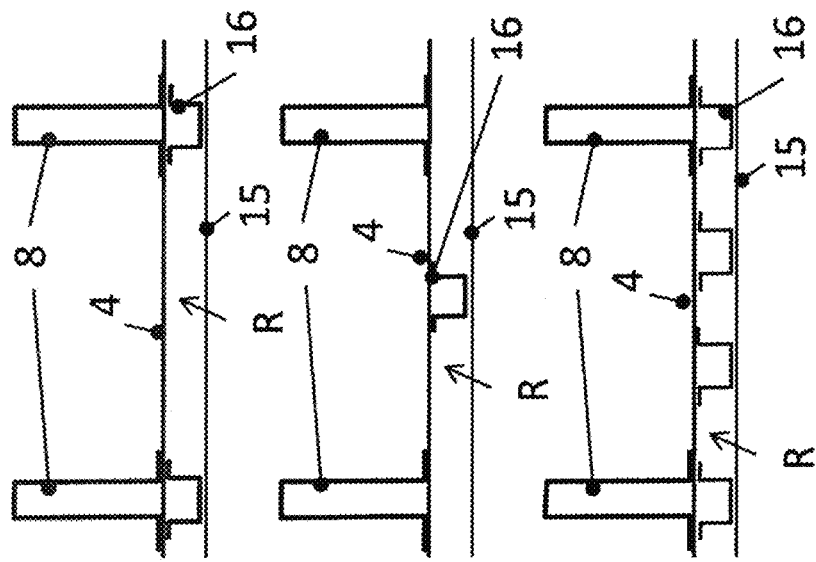
Fig. 7a
Fig. 7b
Fig. 7c
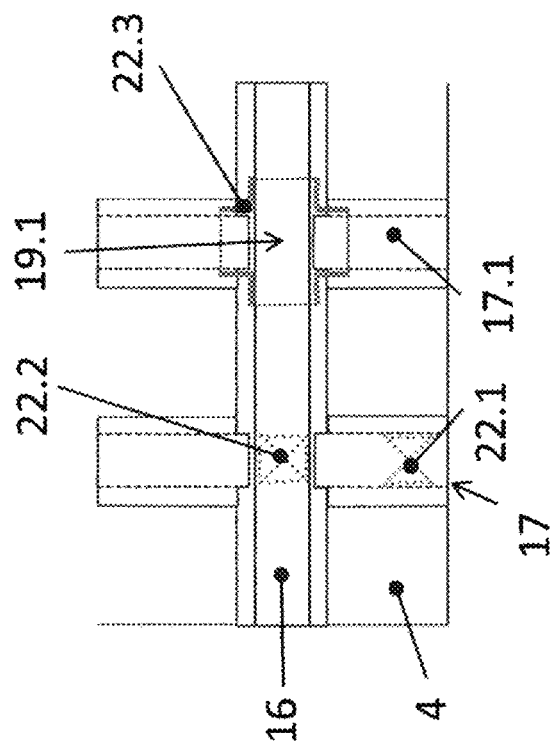
Fig. 6

BATTERY HOUSING

CROSS-REFERENCE TO RELATED APPLICATIONS

This application is the United States national phase of International Application No. PCT/EP2017/070008 filed Aug. 8, 2017, and claims priority to German Patent Application No. 10 2016 214 974.1 filed Aug. 11, 2016, the disclosures of which are hereby incorporated by reference in their entirety.

BACKGROUND OF THE INVENTION

Field of the Invention

The invention relates to a battery housing for receiving battery elements, in particular for a vehicle, comprising a case formed by a frame composed of one or more profiles and at least one first floor which provides an interior region for the battery elements, a second floor which is positioned at a distance below the first floor and defines a space between itself and the first floor, and a cover for covering the case.

Description of Related Art

The increasing electrification of motor vehicles, in particular cars, and the simultaneous customer desire for a long travel range of such vehicles, are promoting the development of powerful battery concepts.

For the integration of batteries in motor vehicles, not only do the primary electrical requirements play a decisive role but also the secondary mechanical requirements. The latter must be fulfilled in order to guarantee high operating safety, even in the event of a crash. Here the battery housing has particular importance.

The battery housing must namely be able to withstand not insignificant mechanical loads which may act from the side, front, or rear or also from below. The loads occurring can be represented by quasi-static substitute load cases, but their handling may be very difficult since, as far as possible, the battery or individual battery elements must not suffer damage.

In relation to the floor of the battery housing, further aspects play an important role such as reliable water-tightness, the possibility of arranging cooling, corrosion protection, the capacity for screening internal and external electromagnetic fields, and reparability. It is essential to minimize the installation space required for the battery housing in order to be able to accommodate as many battery elements as possible in the limited space of the vehicle body and ensure adequate ground clearance.

In particular, the factors of small installation space and the required crash performance constitute a conflict of objectives. This is because structures in a small installation space have a low resistance moment. Furthermore, a side impact requires a different structure from a front or rear impact, so the crash structures compete with each other for installation space.

Battery housings for vehicle batteries are generally known. The floor of the battery housing usually consists of two plates, a first floor or (battery housing) base plate, and a second floor or underrun protection. The floor plate seals the battery housing in the region of the arranged battery elements. It also reinforces the battery housing structure for all crash load cases, in particular for lateral crash loads.

Often, a cooling system is used below the floor plate, so good thermal conductivity is required. The underrun protection protects against crash loads from below and only partially against other crash loads. It must be replaceable in the event of damage. In must also be corrosion-resistant.

German publication DE 10 2009 037 138 A1 discloses a battery case for a battery in a motor vehicle which comprises an upper shell and a lower shell, and a shell made of metallic material which at least in portions surrounds the lower shell. The lower shell may have a rib structure in the floor region. The crash performance under loads acting transversely to the ribs however requires improvement.

SUMMARY OF THE INVENTION

The object of the invention is to indicate an improved battery housing which in particular can meet the mechanical requirements in the event of a crash.

This object is achieved in that one or more longitudinal reinforcing elements and/or one or more transverse reinforcing elements are arranged in the space.

The provision of a case formed by a frame composed of one or more profiles and at least one first floor which provides an interior region for the battery elements, and a cover for covering the case, firstly guarantees the necessary water-tightness. The mechanical requirements in the case of a crash however are fulfilled by the arrangement of one or more longitudinal reinforcing elements and/or one or more transverse reinforcing elements in a space which is defined between the first and second floors when a second floor is arranged spaced below the first floor. The space between the first and the second floors is optimally used to further improve the crash performance of the battery housing. Crash reinforcements between the first and second floors of the battery housing offer the advantage that they support crash loads from the sides, from the front/rear, and also from below. Furthermore, crash reinforcements between the first and the second floors of the battery housing may partially replace reinforcements inside the battery housing. This increases the installation space for batteries and above all, larger battery elements may be used.

A battery element is in particular a (rechargeable) accumulator for electrical energy on an electrochemical basis. A battery element may for example comprise one or more (interconnected) primary cells or one or more (interconnected) secondary cells. The term "battery element" in particular therefore also means a battery pack or an accumulator cell.

The term "space" means a closed volume between the first and second floors inside the battery housing.

The terms "longitudinal reinforcing element" and/or "transverse reinforcing element" mean in particular a profile made of a sheet metal, preferably sheet steel. Preferably, high-strength steel materials with good cold forming and/or hot forming properties are used. The cross-section of the reinforcing elements may be adapted individually and optimally to the requirements imposed. Preferably, the profiles are configured as top-hat profiles, C-shaped profiles or rectangular profiles. The cross-sectional form is not however restricted to said designs. Where longitudinal and transverse reinforcements are present, these may be connected together or joined at their intersections or crossing points, preferably by substance bonding. Alternatively, special connecting components may be used, which for example have flanges and may be attached to the longitudinal and/or transverse reinforcements.

According to one embodiment, in its interior region, the battery housing comprises one or more longitudinal stiffening elements and/or one or more transverse stiffening elements, wherein the one or more longitudinal stiffening elements and/or the one or more transverse stiffening elements form compartments for the battery elements. Since one or more battery elements are provided, the number of compartments formed from the longitudinal stiffening elements and/or transverse stiffening elements corresponds to the number of battery elements to be provided or electronic components to be integrated. This achieves a greater stability for all battery elements. The longitudinal stiffening elements and/or transverse stiffening elements also reinforce the structure of the battery housing, in particular for all crash load cases. Stiffening elements (longitudinal and/or transverse) may alternatively or additionally be arranged between the first and the second floors.

According to one embodiment, the one or more longitudinal reinforcing elements are each formed so as to be continuous or multipiece in the longitudinal direction (in relation to the installation position of the battery housing in the direction of travel), and/or the one or more transverse reinforcing elements are each formed so as to be continuous or multipiece in the transverse direction (in relation to the installation position of the battery housing transversely to the direction of travel), and/or the one or more longitudinal stiffening elements are each formed so as to be continuous or multipiece in the longitudinal direction, and/or the one or more transverse stiffening elements are each formed so as to be continuous or multipiece in the transverse direction.

The space provided between the first and the second floors defines a distance or a height between the two floors. According to one embodiment, only part of the height, for example half of the height, is used for the longitudinal reinforcing elements, and the other half of the height for the transverse reinforcing elements; thus both the longitudinal and the transverse reinforcing elements may be formed so as to be substantially continuous. The reinforcing elements in the longitudinal and transverse directions are arranged at different planes inside the space. The continuous design on different planes is a good compromise with regard to optimal crash design under loads acting from the front, rear and side.

In a further embodiment, the longitudinal reinforcing elements and the transverse reinforcing elements in particular use the full height of the space between the first and second floors. The reinforcing elements which must meet the critical crash requirement (front/rear or side) are designed so as to be continuous. This means that if the crash load case in the longitudinal direction is critical, the longitudinal reinforcing elements are designed so as to be continuous and the transverse reinforcing elements are multipiece in the transverse direction; if the crash load case in the transverse direction is critical, the transverse reinforcing elements are designed so as to be continuous and the longitudinal reinforcing elements are multipiece in the longitudinal direction. It is also conceivable that both the longitudinal and the transverse reinforcing elements are multipiece.

According to one embodiment, the longitudinal reinforcing elements and/or the transverse reinforcing elements may be additionally reinforced at least in regions, in particular with plastic. The reinforcement prevents the longitudinal and/or transverse reinforcing elements from bending in and/or out under load. Alternatively or cumulatively, the longitudinal and transverse reinforcing elements may be reinforced with plastic at their intersections and/or crossing points, in particular by molding plastic around the intersection and/or crossing point, in order to improve at least locally the connection between the longitudinal and transverse reinforcing elements.

A positive influence on the weight of the battery housing may be achieved if, according to one embodiment, the longitudinal reinforcing elements have a different material thickness in the longitudinal direction, and/or the transverse reinforcing elements have a different material thickness in the transverse direction. The reinforcing elements, where continuous (in one piece), may be formed as tailored products (tailored blank, tailored strip, tailored rolled blank etc.), wherein the material thickness of the reinforcing element is selected to be thicker in the edge region of the case than in the central region. If the reinforcing elements are multipiece in the longitudinal direction and/or transverse direction, the reinforcing elements in the edge region of the case have a greater material thickness than the reinforcing elements in the flush arrangement in the central region of the case. In this way, the reinforcing elements are designed or arranged so as to meet needs and/or are optimized for weight.

A further possibility for optimization lies in that, according to one embodiment, the longitudinal reinforcing elements have a variable height and/or width in the longitudinal direction, and/or the transverse reinforcing elements have a variable height and/or width in the transverse direction, in particular if they are designed taller and/or wider in the edge region of the case than in the central region of the case.

According to one embodiment, the longitudinal reinforcing elements may be arranged in the space below the longitudinal stiffening elements, and/or the transverse reinforcing elements may be arranged in the space below the transverse stiffening elements.

According to a further embodiment, one to three longitudinal reinforcing elements may be arranged in the space below and between the longitudinal stiffening elements, and/or one to three transverse reinforcing elements may be arranged in the space below and between the transverse stiffening elements.

According to one embodiment, between the first floor and the longitudinal reinforcing elements and/or transverse reinforcing elements arranged below this, a distance and/or cutouts are provided for accommodating a cooling system.

In order to increase the crash safety, according to one embodiment of the battery housing, an undulating or meandering reinforcement is arranged in the interior region of the case, in particular peripherally along the profiles forming the frame. The reinforcement is preferably made of metal, in particular steel, in particular an ultra-high-strength steel, in particular manganese-boron steel.

To connect the battery housing to the body of the vehicle, according to one embodiment a connecting profile is arranged surrounding the case. The connecting profile may, depending on requirements, be formed in one or more pieces, wherein in particular at equidistant intervals, openings are provided for receiving connecting means, in particular bolts or screws. In the event of a crash, the connecting profile is the first part or first region of the battery housing to be exposed to a load and consequently must be designed for this load; this may be adapted via the cross-section of the profile and its material thickness. Preferably, the connecting profile is made of two parts, consisting of two open profiles each made of a sheet metal, preferably sheet steel, and connected together. The two-part connecting profile is connected to the case, preferably by substance bonding, and in the connected state has a cross-section similar to a multi-volume profile.

According to one embodiment, additional reinforcements are arranged at least in regions of the edge region of the case. These may increase the resistance in the edge region of the case or battery housing, whereby lateral bending in or out in the event of a crash can be substantially prevented.

According to one embodiment, the longitudinal reinforcing elements and/or the transverse reinforcing elements may protrude beyond the dimensions of the case, in other words the ends of the reinforcing elements protrude. In particular, the protruding end of the reinforcing element may protrude far into the connecting profile connected to the case and be connected thereto; in the event of a crash, this may substantially prevent an early transfer of the crash load to the longitudinal reinforcing elements and/or transverse reinforcing elements, and hence prevent excessive deformation of the interior region or compartments in which the battery elements or electronic components are integrated.

BRIEF DESCRIPTION OF THE DRAWINGS

The invention is explained in more detail below with reference to exemplary embodiments shown in the drawings. The same parts carry the same reference signs.

FIG. 2a is a diagrammatic, partial cross-section view of an exemplary embodiment of a battery housing, FIG. 2b is a diagrammatic view from below of the embodiment of FIG. 2a without a second floor and without a connecting profile, FIG. 3a is a diagrammatic, partial cross-section view of an exemplary embodiment of a battery housing, FIG. 3b is a diagrammatic view from below of the embodiment of FIG. 3a without a second floor and without a connecting profile, FIG. 4a is a diagrammatic, partial cross-section view of an exemplary embodiment of a battery housing, FIG. 4b is a diagrammatic view from below of the embodiment of FIG. 4a without a second floor and without a connecting profile, FIG. 5a is a diagrammatic, partial cross-section, view of an exemplary embodiment of a battery housing, FIG. 5b is a diagrammatic view from below of the embodiment of FIG. 5a without a second floor and without a connecting profile, FIG. 6 is a diagrammatic, partial view from below of an exemplary embodiment of the battery housing without a second floor and without a connecting profile, and FIGS. 7a-7c are diagrammatic, sectional views of exemplary embodiments of a battery housing.

DESCRIPTION OF THE INVENTION

Figure 1:
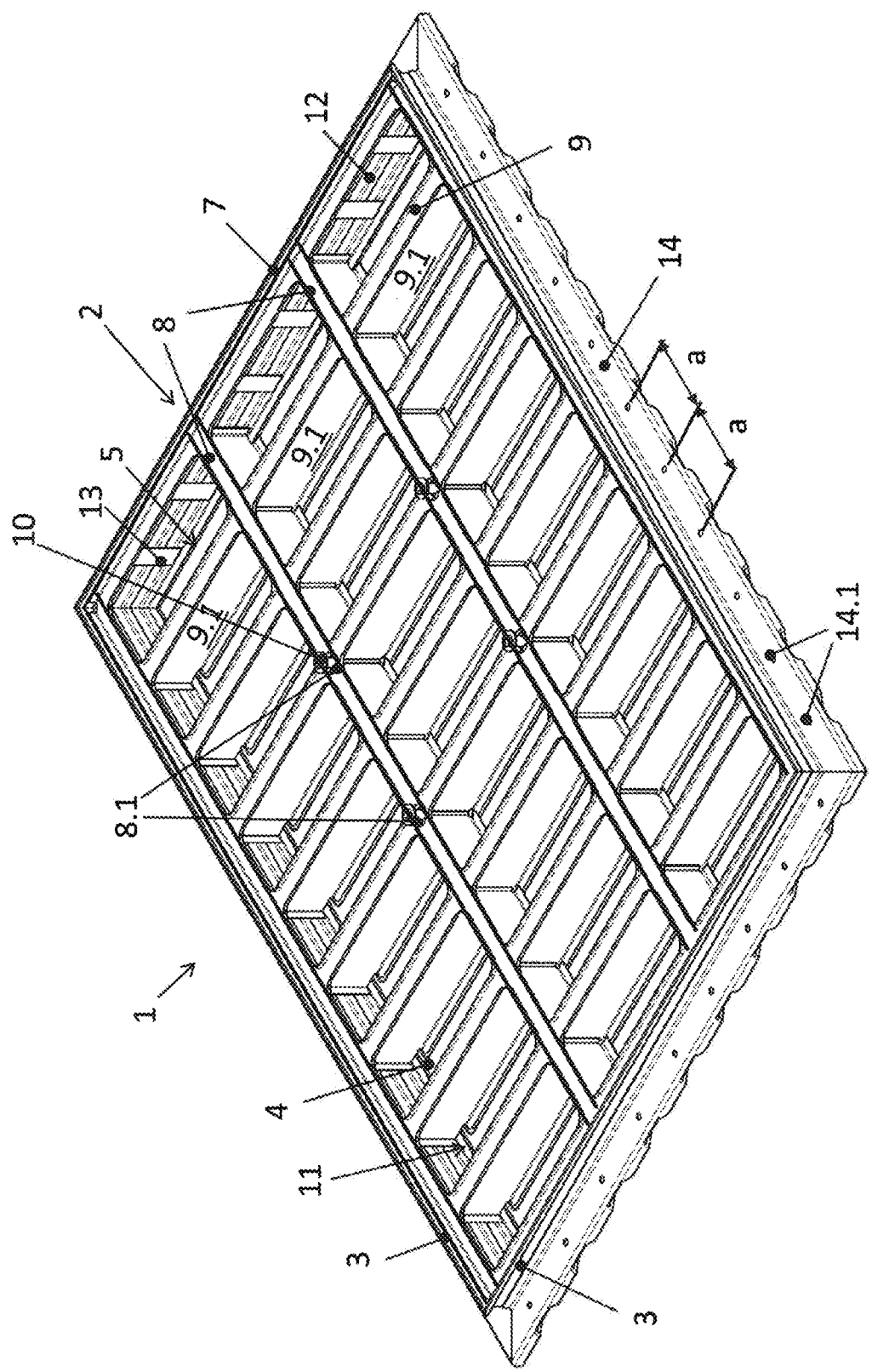
FIG. 1 is a perspective view of an exemplary embodiment of a battery housing without cover.

FIG. 1 shows an exemplary embodiment of the battery housing 1 in a perspective view. The battery housing 1 serves to receive battery elements (not shown) and may in particular be used for a vehicle and arranged in the region of the vehicle floor. The battery housing 1 comprises a case 2 which is formed by a frame 7 composed of one or more profiles 3 and at least one first floor 4 which provides an interior region 5 for the battery elements. The cover 6, for, in particular, tightly covering the case 2 or inner region 5, is not shown in FIG. 1 for reasons of clarity. The profiles 3 forming the frame 7 are preferably made of sheet steel and may be structured. The first floor 4 is made for example from sheet steel. The battery housing 1 in its inner region 5 in this embodiment has two longitudinal stiffening elements 8 and eight transverse stiffening elements 9.

The two longitudinal stiffening elements 8 are formed so as to be continuous in the longitudinal direction. The transverse stiffening elements 9 are formed so as to be interrupted, and comprise several transverse stiffening elements each composed of three individual elements 9.1. The longitudinal stiffening elements 8 each have two openings 8.1 for passage of mounting bushes 10. The longitudinal stiffening elements 8 and the transverse stiffening elements 9 form compartments 11 for the battery elements, so that in this embodiment a total of 27 battery elements can be received.

The battery case 1 contains at least one longitudinal stiffening element 8 and several transverse stiffening elements 9 which together form a compartment structure for the individual battery elements. The longitudinal stiffening elements 8 are formed so as to be continuous in FIG. 1, and the transverse stiffening elements 9 are segmented into individual elements 9.1 at the crossing points. In an alternative embodiment (not shown), the transverse stiffening elements 9 may be continuous and the longitudinal stiffening elements 8 segmented into individual elements at the crossing points.

In the inner region 5 of the case 2, an undulating or meandering reinforcement 12 is arranged in particular peripherally along the profiles 3 forming the frame 7. The undulating or meandering reinforcement 12 may in regions be reinforced by several internal reinforcing strips 13 in order to prevent the reinforcement 12 from breaking up in the event of a crash.

To connect the battery housing to the body of the vehicle, a connecting profile 14 is provided which surrounds the case 2 and, in particular at equidistant intervals a, has openings 14.1 for receiving connecting means (not shown), in particular bolts or screws. The connecting profile 14 is made of one piece or of several pieces, preferably of sheet steel, and is preferably substance-bonded to the case 2.

FIG. 2a shows an exemplary embodiment of a battery housing 1 in a diagrammatic, partial sectional view. The depiction shows the right-hand part of the battery housing 1 relative to the direction of travel, or the left-hand part opposite the direction of travel. The battery housing 1 furthermore comprises a second floor 15 which is arranged spaced below the first floor 4 and defines a space R between itself and the first floor 4. One or more longitudinal reinforcing elements 16 and/or one or more transverse reinforcing elements 17 are arranged in the space R. The longitudinal reinforcing elements 16 (in the longitudinal direction of the vehicle) and the transverse reinforcing elements 17 (in the transverse direction of the vehicle) for example each have a top-hat cross-section and are preferably made of sheet steel. The space R provided between the first floor 4 and the second floor 15 defines a distance or a height H between the two floors 4, 15. Because of their design, the longitudinal reinforcing elements 16 only take up part of the height H of the space R, for example half H/2 of the height H, and the other half H/2 of the height H is used by the transverse reinforcing elements 17. Thus both the longitudinal reinforcing elements 16 and the transverse reinforcing elements 17 may be arranged so as to be substantially continuous on different planes inside the space R (FIG. 2b), and are connected to each other preferably by substance bonding at their crossing points 19 in order to guarantee an optimal crash design of the battery housing 1. Before assembly or before the second floor 15 is attached, preferably releasably, to the battery housing 1, the longitudinal reinforcing elements 16 may be connected preferably by substance bonding to the floor 4, and the transverse reinforcing elements 17 may be connected preferably by substance bonding to the floor 15. In the edge region of the case 2, at least in regions, an additional reinforcement 18 (shown in dotted lines) may be arranged which is preferably arranged above the transverse reinforcing elements 17 and connected thereto, preferably by substance bonding, at least in regions, in order, in the event of a side impact, to prevent bending in at the transition from the frame 7 to the second floor 15. The connecting profile 14 is designed to meet loads and is made of two pieces from two open profiles 14.2, 14.3, preferably of sheet steel, which are connected together. Due to the preferably substance-bonded connection to the case 2, the connecting profile 14 has a cross-section similar to a multi-volume profile. The cross-section of the lower profile 14.3 corresponds substantially to a rectangular trapezium with protruding flanges for connection, preferably by substance bonding, to the upper profile 14.2 and, in the event of a crash, because of its geometry, counters the force occurring with high resistance and in particular prevents bending away downward. The second floor 15 is dimensioned larger than the first floor 4, wherein the edge region of the second floor 15 comes into contact, in particular sealing contact, with a preferably flat region of the lower profile 14.3 so that the space R is in particular sealed against splash water. The profile 3 of the frame 7 has a substantially Z-shaped cross-section, wherein the upper leg 3.1 is formed substantially straight in order to provide a flat and sealing connecting surface to the cover 6. The cover 6 is attached for example mechanically and releasably to the frame 7, in particular via a screw connection 23. The lower leg 3.2 has two flat and sealing connecting regions for the first floor 4 and is provided with a shoulder for the connecting profile 14, which is connected to the lower edge region of the case 2 via material doubling of the edge portions of the profiles 14.2 and 14.3.

The difference between the exemplary embodiment in FIG. 3*a* and the exemplary embodiment in FIG. 2*a* lies in the arrangement of the longitudinal reinforcing elements 16 and transverse reinforcing elements 17, which share the complete height H of the space R between the first floor 4 and the second floor 15. The longitudinal reinforcing elements 16 and the transverse reinforcing elements 17 are thus arranged in one and the same plane. In this embodiment, the longitudinal reinforcing elements 16 are designed so as to be continuous, and the transverse reinforcing elements 17 are multipiece and arranged interruptedly as individual elements 17.1 between the longitudinal reinforcing elements 16 in the transverse direction (FIG. 3*b*). The longitudinal reinforcing elements 16 and the transverse reinforcing elements 17 are connected preferably by substance bonding to the first floor 4, in particular they are also substance-bonded together at their crossing points 19.1. The second floor 15 may be attached, preferably releasably, to the battery housing 1 during assembly. A cooling system or media-carrying line 20 connected to a cooling system may be provided inside the space R below the first floor 4 and connected thereto, for example by substance bonding. In order to allow the coolant line 20 to be substantially continuous from front to back, before connecting the transverse reinforcing elements 17, corresponding cutouts 17.2 are made in the respective individual elements 17.1. A cooling system (or cooling elements) may also be provided in other exemplary embodiments. For example, additional connecting points (not shown), in particular in the form of weld nuts, may be provided at the crossing points 19.1 for additional connection/attachment of the second floor 15.

The exemplary embodiment in FIG. 4*a* differs from the exemplary embodiment in FIG. 2*a* in the arrangement of the longitudinal reinforcing elements 16 and transverse reinforcing elements 17, which are arranged so as to be continuous on different planes inside the space R, but the transverse reinforcing elements 17 run in the upper plane (H/2) and protrude beyond the dimensions of the case 2 (FIG. 4*b*). The protruding region or end 17.3 of the transverse reinforcing element 17 protrudes into the connecting profile 14 and is connected preferably by substance bonding to the connecting profile 14 so that a degree of stability of the battery housing 1 can be guaranteed, and it is sufficient to design the connecting profile 14 merely as a one-piece profile 14.4. For this, preferably, part of the protruding end 17.3 is cut obliquely in order to adapt the end of the transverse reinforcing element to the course of the partial cross-section of the connecting profile 14 and provide a larger connecting surface. The lower edge region of the profile 14.4 is in particular connected peripherally tightly to the edge region of the second floor 15 or is in contact therewith. To ensure adequate water-tightness in particular of the space R, a splash-water protection is arranged in the continuous opening 14.1 inside the connecting profile 14, in the form of an inserted sleeve 21 (shown in dotted lines) which is connected peripherally tightly to the edge of the opening 14.1 at the lower and upper part of the connecting profile 14.

The difference between the exemplary embodiment in FIG. 5*a* and the exemplary embodiment in FIG. 4*a* lies in the arrangement of the longitudinal reinforcing elements 16 and the transverse reinforcing elements 17, wherein both reinforcing elements 16, 17 use the complete height H of the space R. Also, as well as the transverse reinforcing elements 17, the longitudinal reinforcing elements 16 also protrude beyond the dimensions of the case 2 with their protruding ends 16.3 (FIG. 5*b*), so that early transfer of crash loads from the front and rear can take place. In this embodiment too (see FIG. 3*a*), the longitudinal reinforcing elements 16 are designed so as to be continuous and the transverse reinforcing elements 17 are multipiece and arranged interruptedly as individual elements 17.1 between the longitudinal reinforcing elements 16 in the transverse direction. The longitudinal reinforcing elements 16 and transverse reinforcing elements 17 are connected preferably by substance bonding to the first floor 4, in particular they are also substance-bonded to each other at their crossing points 19.1. The connecting profile 14 is formed as a one-piece profile 14.5 which is connected at the one edge region to the frame 7 of the case 2, and at the other edge region in portions to the obliquely cut connecting surfaces of the reinforcing elements 16, 17. In order to protect the space R from splash water, a closing plate or splash-water protection 21.1, which may be made of metal or as a plastic injection molding, is arranged all round and connected tightly to the lower part of the case 2, the edge region of the second floor 15, and the reinforcing elements 16, 17.

FIG. 6 shows various designs for reinforcing the reinforcing elements 16, 17. The transverse reinforcing element 17 may be reinforced in portions, if necessary completely, in its longitudinal direction with plastic in the form of ribs 22.1. Alternatively or additionally, the longitudinal reinforcing elements 16 may for example be reinforced with plastic ribs 22.2 in the region of the crossing point. Also in the region of the crossing point 19.1, the connection between the reinforcing elements 16, 17 may be additionally reinforced by over-molding with plastic 22.3.

FIGS. 7a-7c show various ways in which the longitudinal reinforcing elements 16, here depicted using the example of diagrammatic partial sections transversely to the direction of travel, may be arranged in the space R between the first floor 4 and the second floor 15. Under crash loads from below, it may be advantageous if for example the longitudinal reinforcing elements 16 are each arranged below the longitudinal stiffening elements 8 (FIG. 7a). Depending on the size of the battery element, the distance between the longitudinal stiffening elements 8 may be arranged too high, so that on a crash from the side, the region between the longitudinal stiffening elements 8 cannot be adequately supported. To prevent collapse, the longitudinal reinforcing element 16 is for example arranged in the space R between the longitudinal stiffening elements (FIG. 7b). To meet high crash standards, several longitudinal reinforcing elements 16 may for example be arranged in the space R (FIG. 7c), in particular one to three longitudinal reinforcing elements 16 may be arranged in the space R below and between the longitudinal stiffening elements 8.

The invention is not restricted to the embodiments shown, but reinforcing elements of any arbitrary (cross-sectional) form may be used, such as for example tailored products. For example, the reinforcing elements arranged in the middle of the case may have a smaller material thickness than those at the case edge, in particular if configured so as to be multipiece. The use of the battery housing is particularly preferred in cars, utility vehicles, trucks, special vehicles, buses and coaches, whether with hybrid or purely electric drive, but also in rail vehicles such as for example trams or carriages for transporting passengers.

LIST OF REFERENCE SIGNS

1 Battery housing
2 Case
3 Profile
3.1,3.2 Leg of profile
4 First floor
5 Inner region
6 Cover
7 Frame
8 Longitudinal stiffening element
8.1 Opening in longitudinal stiffening element
9 Transverse stiffening element
10 Mounting bush
11 Compartment
12 Reinforcement
13 Reinforcing strip
14 Connecting profile
14.1 Openings
14.2-14.5 Profiles of connecting profile
15 Second floor, underrun protection
16 Longitudinal reinforcing element
16.3 Protruding end of longitudinal reinforcing element
17 Transverse reinforcing element
17.1 Individual element of transverse reinforcement
17.2 Recess
17.3 Protruding end of transverse reinforcing element
18 Additional reinforcement
19 Intersection
19.1 Crossing point
20 Cooling, coolant line
21 Sleeve, splash-water protection
21.1 Closing plate, splash-water protection
22.1-22.3 Plastic reinforcement, rib
23 Screw connection
a Distance
H Height
R Space

The invention claimed is:

1. A battery housing for receiving battery elements, the battery housing comprising:
   a case formed by a frame comprising one or more profiles and at least one first floor, the case defining an interior region for the battery elements;
   a second floor positioned at a distance below the first floor to define a space between the second floor and the first floor; and
   a cover for covering the case,
   wherein at least one of one or more longitudinal reinforcing elements and one or more transverse reinforcing elements are arranged in the space within the same plane, and
   wherein either the one or more longitudinal reinforcing elements or the one or more transverse reinforcing elements is continuous, and the other one or more reinforcing elements is multipiece.

2. The battery housing as claimed in claim 1, wherein, in the interior region, the battery housing comprises at least one of one or more longitudinal stiffening elements and one or more transverse stiffening elements, and wherein at least one of the one or more longitudinal stiffening elements and the one or more transverse stiffening elements form compartments for the battery elements.

3. The battery housing as claimed in claim 2, wherein at least one of the longitudinal reinforcing elements are arranged in the space below the longitudinal stiffening elements, and the transverse reinforcing elements are arranged in the space below the transverse stiffening elements.

4. The battery housing as claimed in claim 2, wherein at least one of one to three longitudinal reinforcing elements are arranged in the space below and between the longitudinal stiffening elements, and one to three transverse reinforcing elements are arranged in the space below and between the transverse stiffening elements.

5. The battery housing as claimed in claim 1, wherein at least one of:
   the one or more longitudinal stiffening elements are each formed so as to be continuous or multipiece in the longitudinal direction, and
   the one or more transverse stiffening elements are each formed so as to be continuous or multipiece in the transverse direction.

6. The battery housing as claimed in claim 1, wherein at least one of the longitudinal reinforcing elements and the transverse reinforcing elements are additionally reinforced at least in regions.

7. The battery housing as claimed in claim 6, wherein at least one of the longitudinal reinforcing members and the transverse reinforcing elements are additionally reinforced at least in regions with plastic.

8. The battery housing as claimed in claim 1, wherein at least one of the longitudinal reinforcing elements have a different material thickness in the longitudinal direction, and the transverse reinforcing elements have a different material thickness in the transverse direction.

9. The battery housing as claimed in claim 1, wherein at least one of the longitudinal reinforcing elements have at least one of a variable height and width in the longitudinal direction, and the transverse reinforcing elements have at least one of a variable height and width in the transverse direction.

10. The battery housing as claimed in claim 1, wherein, between at least one of the first floor and the longitudinal reinforcing elements and transverse reinforcing elements arranged below the first floor, at least one of a distance and cutouts are provided for accommodating a cooling system.

11. The battery housing as claimed in claim 1, further comprising an undulating reinforcement arranged in the interior region of the case.

12. The battery housing as claimed in claim 11, wherein the undulating reinforcement is arranged in the interior region of the case peripherally along the profiles forming the frame.

13. The battery housing as claimed in claim 1, further comprising a connecting profile surrounding the case.

14. The battery housing as claimed in claim 13, wherein the connecting profile comprises at least two pieces, the at least two pieces defining a multi-volume profile.

15. The battery housing as claimed in claim 14, wherein a lower profile of the multi-volume profile has a cross-sectional shape of a rectangular trapezium.

16. The battery housing as claimed in claim 14, wherein an edge region of the second floor sealingly contacts a flat region of a lower profile of the multi-volume profile.

17. The battery housing as claimed in claim 1, further comprising additional reinforcements arranged at least in edge regions of the case.

18. The battery housing as claimed in claim 1, wherein at least one of the longitudinal reinforcing elements and the transverse reinforcing elements protrude beyond the dimensions of the case.

* * * * *